US012718750B2

(12) United States Patent
Heo et al.

(10) Patent No.: US 12,718,750 B2
(45) Date of Patent: Aug. 25, 2026

(54) DATA DRIVER AND DISPLAY DEVICE INCLUDING THE SAME

(71) Applicant: Samsung Display Co., Ltd., Yongin-si (KR)

(72) Inventors: Sanghyun Heo, Yongin-si (KR); Joon-Chul Goh, Yongin-si (KR); Seongjoo Lee, Yongin-si (KR); Ohjo Kwon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/319,556

(22) Filed: Sep. 4, 2025

(65) Prior Publication Data

US 2026/0004724 A1 Jan. 1, 2026

Related U.S. Application Data

(63) Continuation of application No. 18/429,200, filed on Jan. 31, 2024, now Pat. No. 12,412,512.

(30) Foreign Application Priority Data

Feb. 7, 2023 (KR) ........................ 10-2023-0016427

(51) Int. Cl.
*G09G 3/32* (2016.01)
*G09G 3/20* (2006.01)

(52) U.S. Cl.
CPC ............. *G09G 3/32* (2013.01); *G09G 3/2096* (2013.01); *G09G 2300/0819* (2013.01);
(Continued)

(58) Field of Classification Search
CPC ...... G09G 3/2096; G09G 3/32; G09G 3/3233; G09G 3/3283; G09G 2300/043; G09G 2300/0819; G09G 2300/0842; G09G 2300/0852; G09G 2300/0861; G09G 2310/0272; G09G 2310/0275; G09G 2310/0286; G09G 2310/0289;
(Continued)

(56) References Cited

U.S. PATENT DOCUMENTS 8,063,857 B2 11/2011 Kohno et al.
8,436,793 B2 5/2013 Yamamoto
(Continued)

FOREIGN PATENT DOCUMENTS

KR 10-2012-0070773 A 7/2012
KR 10-2015-0015645 A 2/2015
(Continued)

*Primary Examiner* — Ryan A Lubit
(74) *Attorney, Agent, or Firm* — Womble Bond Dickinson (US) LLP

(57) ABSTRACT

A display device includes: a display panel including a sub-pixel, the sub-pixel including: a first capacitor; a first transistor to generate a driving current, and including a control electrode connected to the first capacitor; a second transistor connected to the first capacitor, and to provide a data voltage or a reference voltage to the first capacitor in response to a write gate signal; and a light emitting element to receive the driving current to emit light; a data driver to selectively output the data voltage or the reference voltage to the first capacitor through a source channel; and a timing controller to control the data driver.

20 Claims, 15 Drawing Sheets

(52) U.S. Cl.
CPC ............... *G09G 2300/0852* (2013.01); *G09G 2300/0861* (2013.01); *G09G 2310/0275* (2013.01); *G09G 2310/0286* (2013.01); *G09G 2310/0289* (2013.01); *G09G 2310/0291* (2013.01); *G09G 2310/0294* (2013.01); *G09G 2310/08* (2013.01); *G09G 2320/0233* (2013.01); *G09G 2320/045* (2013.01); *G09G 2320/0673* (2013.01)

(58) Field of Classification Search
CPC ... G09G 2310/0291; G09G 2310/0294; G09G 2310/08; G09G 2320/0233; G09G 2320/045; G09G 2320/0673
See application file for complete search history.

(56) References Cited

U.S. PATENT DOCUMENTS

| | | | | |
|---|---|---|---|---|
| 11,957,017 | B2 * | 4/2024 | Nishiyama | G09G 3/3233 |
| 2008/0218452 | A1 * | 9/2008 | Kohno | G09G 3/3233 345/55 |
| 2012/0069059 | A1 * | 3/2012 | Lee | G09G 3/3225 345/76 |
| 2015/0035734 | A1 * | 2/2015 | Lee | G09G 3/3258 345/76 |
| 2016/0247451 | A1 * | 8/2016 | Kim | G09G 3/3233 |
| 2017/0092188 | A1 * | 3/2017 | Kim | G09G 3/2096 |
| 2019/0103055 | A1 * | 4/2019 | Gao | G09G 3/3233 |
| 2019/0340996 | A1 * | 11/2019 | Kim | G09G 3/3258 |
| 2020/0286448 | A1 * | 9/2020 | Kim | G09G 5/18 |
| 2021/0193052 | A1 * | 6/2021 | Kim | G09G 3/2003 |
| 2022/0122513 | A1 * | 4/2022 | Hwang | G09G 3/3291 |
| 2022/0198982 | A1 * | 6/2022 | Choi | G09G 3/20 |
| 2022/0415261 | A1 * | 12/2022 | Kim | G09G 3/3688 |
| 2023/0037207 | A1 * | 2/2023 | Hong | G09G 3/3233 |
| 2023/0065092 | A1 * | 3/2023 | Kim | G09G 3/006 |
| 2023/0178029 | A1 * | 6/2023 | Jang | G06F 3/013 345/691 |
| 2023/0316983 | A1 * | 10/2023 | Lo | G09G 3/2092 |

FOREIGN PATENT DOCUMENTS

| | | | |
|---|---|---|---|
| KR | 10-2019-0052822 | A | 5/2019 |
| KR | 10-2020-0036415 | A | 4/2020 |
| KR | 10-2021-0157642 | A | 12/2021 |
| KR | 10-2022-0030416 | A | 3/2022 |
| KR | 10-2404159 | B1 | 5/2022 |
| KR | 10-2417120 | B1 | 7/2022 |

* cited by examiner

DATA DRIVER AND DISPLAY DEVICE INCLUDING THE SAME

CROSS-REFERENCE TO RELATED APPLICATION

The present application is a continuation application of U.S. patent application Ser. No. 18/429,200, filed on Jan. 31, 2024, which claims priority to and the benefit of Korean Patent Application No. 10-2023-0016427, filed on Feb. 7, 2023, in the Korean Intellectual Property Office (KIPO), the entire disclosures of both of which are incorporated by reference herein.

BACKGROUND

1. Field

Aspects of embodiments of the present disclosure relate to a data driver, and a display device including the data driver.

2. Description of the Related Art

In general, a display device may include a display panel, a gate driver, a data driver, and a timing controller. The display panel may include a plurality of gate lines, a plurality of data lines, and a plurality of sub-pixels electrically connected to the gate lines and the data lines. The gate driver may provide gate signals to the gate lines, the data driver may provide data voltages to the data lines, and the timing controller may control the gate driver and data driver.

Recently, display devices that provide virtual reality (VR) or augmented reality (AR) are emerging. In this case, a display device having a low area and high pixels per inch (ppi) may be desired.

The above information disclosed in this Background section is for enhancement of understanding of the background of the present disclosure, and therefore, it may contain information that does not constitute prior art.

SUMMARY

As the ppi increases, a dynamic range of a data voltage may be gradually decreased. In other words, as the ppi increases, a luminance accuracy according to a variation in the data voltage may be relatively reduced. Accordingly, in order to expand the dynamic range of the data voltage, a pixel structure in which the data voltage is written through coupling of a capacitor may be used.

One or more embodiments of the present disclosure are directed to a data driver capable of selectively outputting a reference voltage or a data voltage.

One or more embodiments of the present disclosure are directed to a display device including the data driver.

For example, embodiments of the present disclosure may be directed to a data driver that outputs a data voltage to a sub-pixel through a source channel, and a display device including the data driver.

However, the aspects and features of the present disclosure are not limited thereto. In other words, the aspects and features of the present disclosure may be extended without departing from the spirit and the scope of the present disclosure, as would be understood by those having ordinary skill in the art.

According to one or more embodiments of the present disclosure, a display device includes: a display panel including a sub-pixel, the sub-pixel including: a first capacitor; a first transistor configured to generate a driving current, and including a control electrode connected to the first capacitor; a second transistor connected to the first capacitor, and configured to provide a data voltage or a reference voltage to the first capacitor in response to a write gate signal; and a light emitting element configured to receive the driving current to emit light; a data driver configured to selectively output the data voltage or the reference voltage to the first capacitor through a source channel; and a timing controller configured to control the data driver.

In an embodiment, the first transistor may further include a first electrode configured to receive a first power voltage, and a back gate electrode configured to receive the first power voltage.

In an embodiment, the sub-pixel may further include: a third transistor including a control electrode configured to receive a compensation gate signal, a first electrode connected to a second node, and a second electrode connected to a first node; a fourth transistor including a control electrode configured to receive an emission signal, a first electrode connected to the second node, and a second electrode connected to a third node; a fifth transistor including a control electrode configured to receive a bias gate signal, a first electrode, and a second electrode connected to the third node; and a second capacitor including a first electrode connected to the first node, and a second electrode configured to receive a first power voltage. The first capacitor may include a first electrode connected to a second electrode of the second transistor, and a second electrode connected to the first node. The first transistor may include the control electrode connected to the first node, a first electrode configured to receive the first power voltage, and a second electrode connected to the second node. The second transistor may include a control electrode configured to receive the write gate signal, a first electrode configured to receive the data voltage or the reference voltage, and the second electrode connected to the first electrode of the first capacitor. The light emitting element may include a first electrode connected to the third node, and a second electrode configured to receive a second power voltage.

In an embodiment, the first electrode of the fifth transistor may be grounded.

In an embodiment, the first electrode of the fifth transistor may be configured to receive a substrate voltage applied to a substrate for forming the display panel.

In an embodiment, the substrate may be a p-type substrate.

In an embodiment, the emission signal, the compensation gate signal, the bias gate signal, and the write gate signal may have activation periods in an initialization period. The compensation gate signal, the bias gate signal, and the write gate signal may have the activation periods in a threshold voltage compensation period. The write gate signal may have the activation period in a data writing period.

In an embodiment, the first capacitor may be configured to receive the reference voltage in the initialization period and the threshold voltage compensation period, and the first capacitor may be configured to receive the data voltage in the data writing period.

In an embodiment, the emission signal and the bias gate signal may have the activation periods in an anode holding period.

In an embodiment, the sub-pixel may further include: a third transistor including a control electrode configured to receive an emission signal, a first electrode configured to receive a first power voltage, and a second electrode connected to a second node; a fourth transistor including a control electrode configured to receive a bias gate signal, a first electrode configured to receive an initialization voltage, and a second electrode connected to a third node; and a second capacitor including a first electrode configured to receive the first power voltage and a second electrode connected to the second node. The first transistor may include the control electrode connected to a first node, a first electrode connected to the second node, and a second electrode connected to the third node. The second transistor may include a control electrode configured to receive the write gate signal, a first electrode configured to receive the data voltage or the reference voltage, and a second electrode connected to the first node. The light emitting element may include a first electrode connected to the third node, and a second electrode configured to receive a second power voltage.

In an embodiment, the source channel may include an output buffer configured to selectively output the data voltage or the reference voltage.

In an embodiment, the source channel may further include a first decoder configured to provide a gamma voltage from among a plurality of gamma voltages to the output buffer as the data voltage, and the data driver may further include a second decoder configured to provide the reference voltage to the output buffer.

In an embodiment, the second decoder may be configured to provide a gamma voltage from among the plurality of gamma voltages as the reference voltage.

In an embodiment, the source channel may further include: a shift register configured to generate a sampling signal; a sampling latch configured to store a data signal in response to the sampling signal; a holding latch configured to receive the data signal from the sampling latch to store the data signal; a level shifter configured to selectively receive the data signal or reference voltage data, and shift voltage levels of the data signal and the reference voltage data; and a first decoder configured to generate the data voltage based on the data signal having an increased voltage level, generate the reference voltage based on the reference voltage data having an increased voltage level, and provide the data voltage or the reference voltage to the output buffer.

In an embodiment, the source channel may be connected to a plurality of pixel columns, and may be configured to concurrently output the reference voltage to the pixel columns, and sequentially output data voltages to the pixel columns, respectively.

According to one or more embodiments of the present disclosure, a data driver to output a data voltage to a sub-pixel, includes: a first decoder configured to provide the data voltage to an output buffer based on a plurality of gamma voltages; and the output buffer configured to selectively output the data voltage or a reference voltage to a data line directly connected to a transistor of the sub-pixel.

In an embodiment, the first decoder may be configured to provide a gamma voltage from among the plurality of gamma voltages to the output buffer as the data voltage, and the data driver may further include a second decoder configured to provide the reference voltage to the output buffer.

In an embodiment, the second decoder may be configured to provide a gamma voltage from among the plurality of gamma voltages as the reference voltage.

In an embodiment, the data driver may further include: a shift register configured to generate a sampling signal; a sampling latch configured to store a data signal in response to the sampling signal; a holding latch configured to receive the data signal from the sampling latch to store the data signal; and a level shifter configured to selectively receive the data signal or reference voltage data, and shift voltage levels of the data signal and the reference voltage data. The first decoder may be configured to generate the data voltage based on the data signal having an increased voltage level, generate the reference voltage based on the reference voltage data having an increased voltage level, and provide the data voltage or the reference voltage to the output buffer.

According to one or more embodiments of the present disclosure, a data driver may selectively output a data voltage or a reference voltage to a first capacitor through a source channel, so that an offset voltage when the data voltage is output and an offset voltage when the reference voltage is output may be equal to or substantially equal to each other.

According to one or more embodiments of the present disclosure, a display device may include a data driver configured to output a data voltage and a reference voltage with the same or substantially the same (e.g., identical) offset voltage as each other, so that a luminance difference between the data lines may be minimized or reduced.

However, the aspects and features of the present disclosure are not limited thereto. Thus, the aspects and features of the present disclosure may be extended without departing from the spirit and the scope of the present disclosure, as would be understood by those having ordinary skill in the art.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
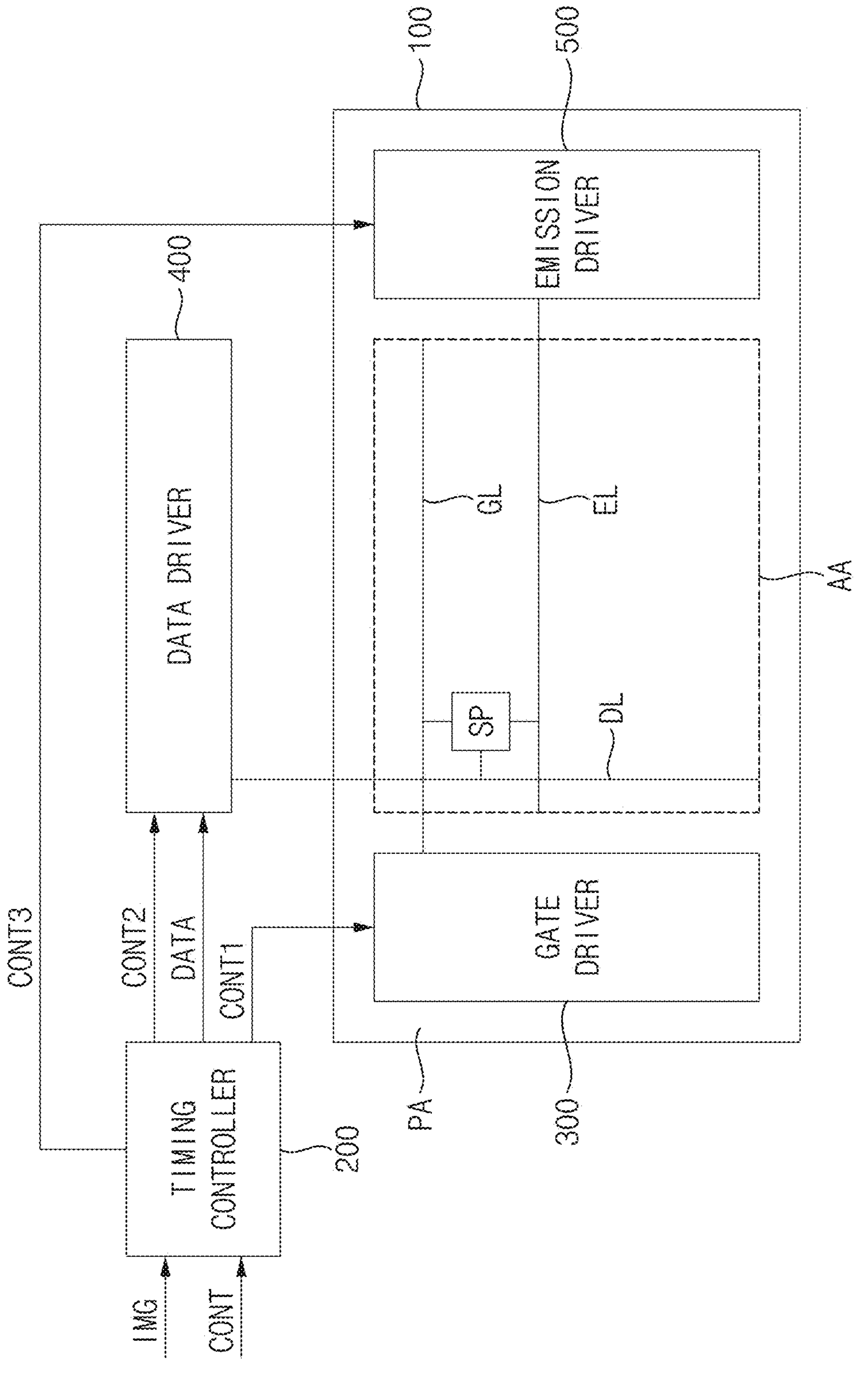
FIG. 1 is a block diagram showing a display device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram showing a display device according to one or more embodiments of the present disclosure.

Referring to FIG. 1, a display device may include a display panel 100, a timing controller 200, a gate driver 300, a data driver 400, and an emission driver 500. According to an embodiment, the timing controller 200 and data driver 400 may be integrated together on a single chip.

The display panel 100 may include a display region AA to display an image, and a peripheral region PA adjacent to the display region AA. According to an embodiment, the gate driver 300 and the emission driver 500 may be mounted on the peripheral region PA.

The display panel 100 may include a plurality of gate lines GL, a plurality of data lines DL, a plurality of emission lines EL, and a plurality of sub-pixels SP electrically connected to the gate lines GL, the data lines DL, and the emission lines EL. The gate lines GL and the data lines DL may extend in directions crossing or intersecting each other. The emission lines EL and the data lines DL may extend in directions crossing or intersecting each other.

The timing controller 200 may receive input image data IMG and an input control signal CONT from a host processor (e.g., a graphic processing unit (GPU) and/or the like). For example, the input image data IMG may include red image data, green image data, and blue image data. According to an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, a third control signal CONT3, and a data signal DATA based on the input image data IMG and the input control signal CONT.

The timing controller 200 may generate the first control signal CONT1 for controlling an operation of the gate driver 300 based on the input control signal CONT, and output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT, and output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The timing controller 200 may generate the third control signal CONT3 for controlling an operation of the emission driver 500 based on the input control signal CONT, and output the generated third control signal CONT3 to the emission driver 500. The third control signal CONT3 may include a vertical start signal and an emission clock signal.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The emission driver 500 may generate emission signals for driving the emission lines EL in response to the third control signal CONT3 received from the timing controller 200. The emission driver 500 may output the emission signals to the emission lines EL. For example, the emission driver 500 may sequentially output the emission signals to the emission lines EL.

Figure 2:
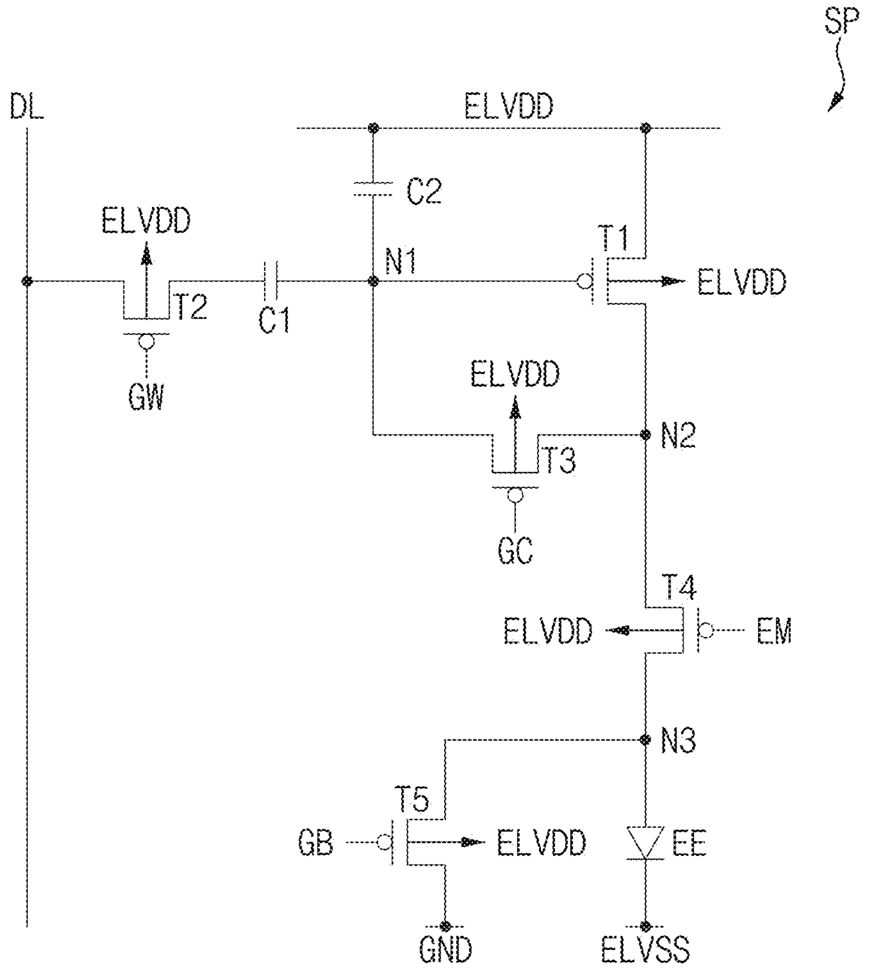
FIG. 2 is a circuit diagram showing an example of a sub-pixel in FIG. 1.
Figure 3:
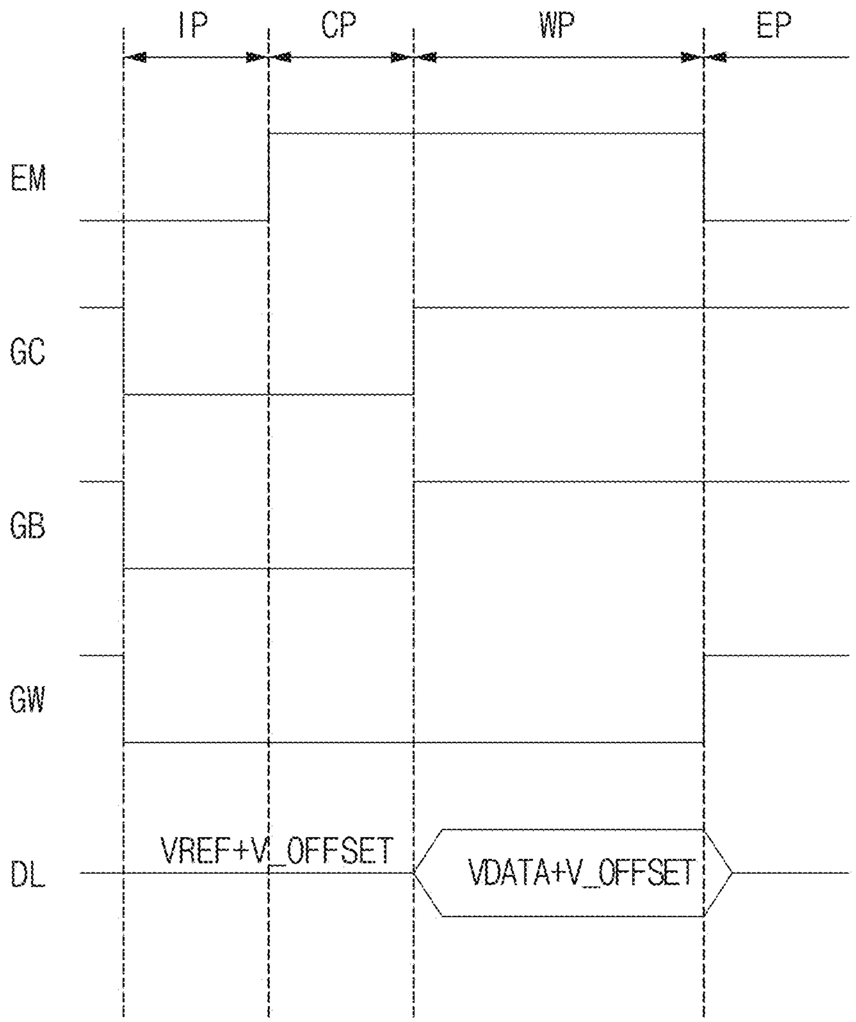
FIG. 3 is a timing diagram showing an example of signals used to drive the sub-pixel of FIG. 2.

FIG. 2 is a circuit diagram showing an example of a sub-pixel SP in FIG. 1. FIG. 3 is a timing diagram showing an example of signals used to drive the sub-pixel SP of FIG. 2.

Referring to FIGS. 1 to 3, a sub-pixel SP may include a first capacitor C1, a first transistor T1, a second transistor T2, and a light emitting element EE. The first transistor T1 may include a control electrode connected to the first capacitor C1, and may generate a driving current. The second transistor T2 may provide a data voltage VDATA or a reference voltage VREF to the first capacitor C1 in response to a write gate signal GW, and may be connected to the first capacitor C1. The light emitting element EE may receive the driving current to emit light.

For example, the first transistor T1 may include the control electrode connected to a first node N1, a first electrode to receive a first power voltage ELVDD (e.g., a high power voltage), and a second electrode connected to a second node N2. The second transistor T2 may include a control electrode to receive the write gate signal GW, a first electrode to receive the data voltage VDATA or the reference voltage VREF, and a second electrode connected to a first electrode of the first capacitor C1. The sub-pixel SP may further include a third transistor T3, a fourth transistor T4, a fifth transistor T5, and a second capacitor C2. The third transistor T3 may include a control electrode to receive a compensation gate signal GC, a first electrode connected to the second node N2, and a second electrode connected to the first node N1. The fourth transistor T4 may include a control electrode configured to receive an emission signal EM, a first electrode connected to the second node N2, and a second electrode connected to a third node N3. The fifth transistor T5 may include a control electrode to receive a bias gate signal GB, a first electrode, and a second electrode connected to the third node N3. The first capacitor C1 may include the first electrode connected to the second electrode of the second transistor T2, and a second electrode connected to the first node N1. The second capacitor C2 may include a first electrode connected to the first node N1, and a second electrode to receive the first power voltage ELVDD. The light emitting element EE may include a first electrode connected to the third node N3, and a second electrode to receive a second power voltage ELVSS (e.g., a low power voltage). According to an embodiment, the first electrode of the fifth transistor T5 may be grounded (e.g., connected to ground GND).

Although in the present embodiment, the write gate signal GW, the compensation gate signal GC, and the bias gate signal GB are gate signals generated by the gate driver 300, the present disclosure is not limited thereto, and the write gate signal GW, the compensation gate signal GC, and the bias gate signal GB may be signals generated by the emission driver 500.

In an embodiment, the first to fifth transistors T1, T2, T3, T4, and T5 may be implemented as n-channel metal oxide semiconductor (NMOS) transistors. In this case, a low voltage level may be a deactivation level (e.g., an off level), and a high voltage level may be an activation level (e.g., an on level). For example, when a signal applied to a control electrode of the NMOS transistor has a low voltage level, the NMOS transistor may be turned off. For example, when a signal applied to the control electrode of the NMOS transistor has a high voltage level, the NMOS transistor may be turned on. In other words, the activation level and the deactivation level may be determined depending on the type of the transistor.

In another embodiment, as illustrated in FIG. 2, the first to fifth transistors T1, T2, T3, T4, and T5 may be implemented as p-channel metal oxide semiconductor (PMOS) transistors. In this case, a low voltage level may be an activation level (e.g., an on level), and a high voltage level may be a deactivation level (e.g., an off level). For example, when a signal applied to a control electrode of the PMOS transistor has a low voltage level, the PMOS transistor may be turned on. For example, when a signal applied to the control electrode of the PMOS transistor has a high voltage level, the PMOS transistor may be turned off.

According to an embodiment, the emission signal EM, the compensation gate signal GC, the bias gate signal GB, and the write gate signal GW may have activation periods in an initialization period IP. The compensation gate signal GC, the bias gate signal GB, and the write gate signal GW may have activation periods in a threshold voltage compensation period CP. The write gate signal GW may have an activation period in a data writing period WP. The emission signal EM may have an activation period in an emission period EP. The activation period may be a period having an activation level (e.g., an on level).

According to an embodiment, the reference voltage VREF may be applied to the first capacitor C1 in the initialization period IP and the threshold voltage compensation period CP, and the data voltage VDATA may be applied to the first capacitor C1 in the data writing period WP.

For example, the second to fifth transistors T2, T3, T4, and T5 may be turned on in the initialization period IP. The reference voltage VREF and an offset voltage V_OFFSET may be applied to the data line DL. Therefore, a voltage of the first electrode of the first capacitor C1 may be VREF+V_OFFSET, and a voltage of the second electrode of the first capacitor C1 may be 0 V (e.g., the ground GND).

For example, the first to third transistors T1, T2, and T3 may be turned on in the threshold voltage compensation period CP. The reference voltage VREF and the offset voltage V_OFFSET may be applied to the data line DL. Therefore, the voltage of the first electrode of the first capacitor C1 may be VREF+V_OFFSET, and the voltage of the second electrode of the first capacitor C1 may be ELVDD-VTH_T1. Here, VTH_T1 may be a threshold voltage of the first transistor T1.

For example, the second transistor T2 may be turned on in the data writing period WP. The data voltage VDATA and the offset voltage V_OFFSET may be applied to the data line DL. Therefore, the voltage of the first electrode of the first capacitor C1 may be VDATA+V_OFFSET, and the voltage of the second electrode of the first capacitor C1 may be ELVDD−VTH_T1+ (C1/(C1+C2))*(VDATA−VREF).

For example, in the emission period EP, because the driving current is proportional to a square of a gate-source voltage, the first transistor T1 may generate the driving current that is proportional to a square of ((VDATA+V_OFFSET)−(VREF+V_OFFSET)). The light emitting element EE may emit light having a luminance corresponding to the driving current. As described above, when an offset voltage output with the data voltage VDATA and an offset voltage output with the reference voltage VREF are equal to or substantially equal to each other, a component for the offset voltage in the driving current may be minimized or reduced. The offset voltage V_OFFSET will be described in more detail below.

According to an embodiment, the first transistor T1 may include the first electrode to receive the first power voltage ELVDD, and may further include a back gate electrode configured to receive the first power voltage ELVDD. The threshold voltage of the first transistor T1 may be affected by a voltage between a source electrode (e.g., the first electrode) and the back gate electrode of the first transistor T1 (e.g., a body effect). Therefore, because the first power voltage ELVDD may be applied to the back gate electrode of the first transistor T1, a variation in the threshold voltage caused by the body effect may be minimized or reduced.

According to an embodiment, each of the second to fifth transistors T2, T3, T4, and T5 may further include a back gate electrode to receive the first power voltage ELVDD.

Figure 4:
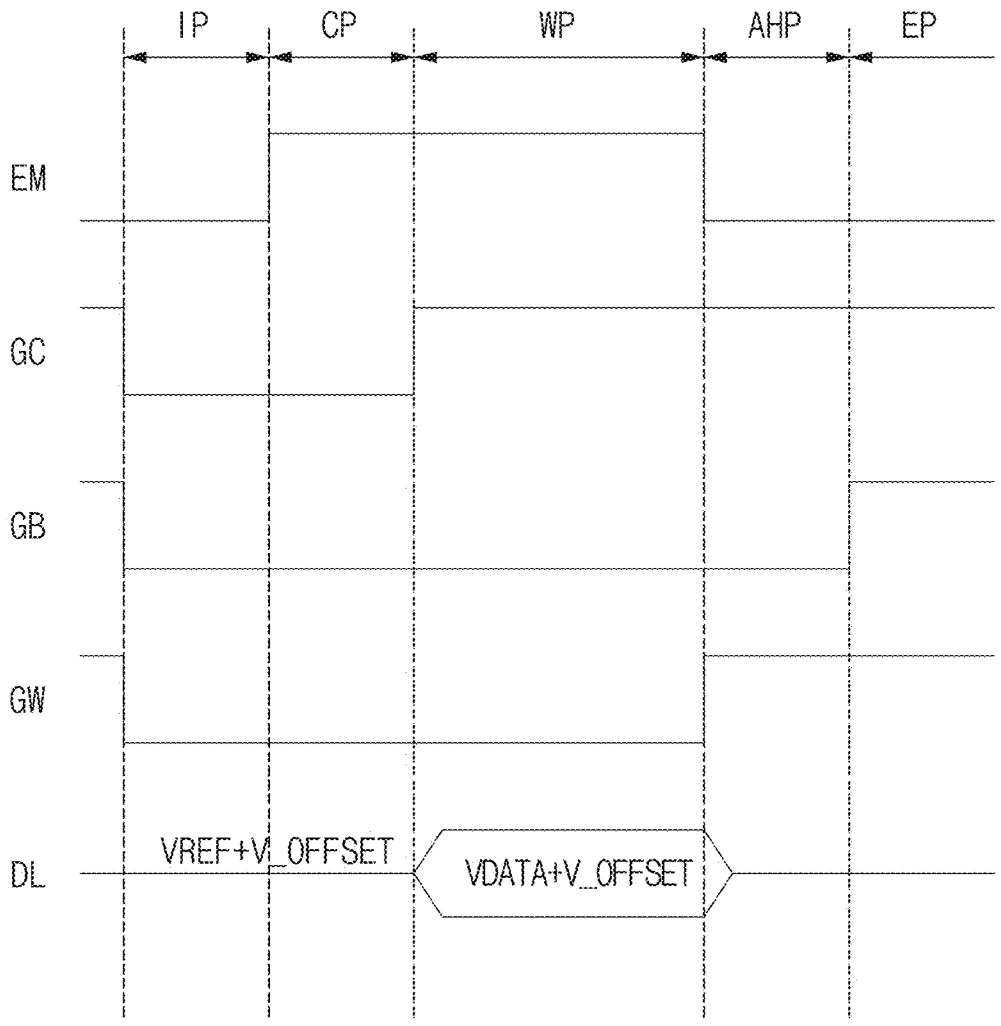
FIG. 4 is a timing diagram showing an example of signals used to drive the sub-pixel of FIG. 2.

FIG. 4 is a timing diagram showing an example of signals used to drive the sub-pixel SP of FIG. 2.

In FIG. 4, the same reference numerals and symbols denote the same or substantially the same (or similar) components as those described above. Because the driving of the sub-pixel SP according to the present embodiment may be the same or substantially the same as the driving of the sub-pixel SP described above with reference to FIG. 3, except for an anode holding period AHP, redundant description may not be repeated, and the differences may be mainly described in more detail hereinafter.

Referring to FIGS. 2 and 4, the emission signal EM and the bias gate signal GB may have the activation periods in an anode holding period AHP. The reference voltage VREF may be applied to the first capacitor C1 in the anode holding period AHP.

For example, the first, fourth, and fifth transistors T1, T4, and T5 may be turned on in the anode holding period AHP. Accordingly, a current path connected to the ground GND through the first, fourth, and fifth transistors T1, T4, and T5 may be formed, and a parasitic capacitor may be discharged due to a current flowing through the current path.

Figure 5:
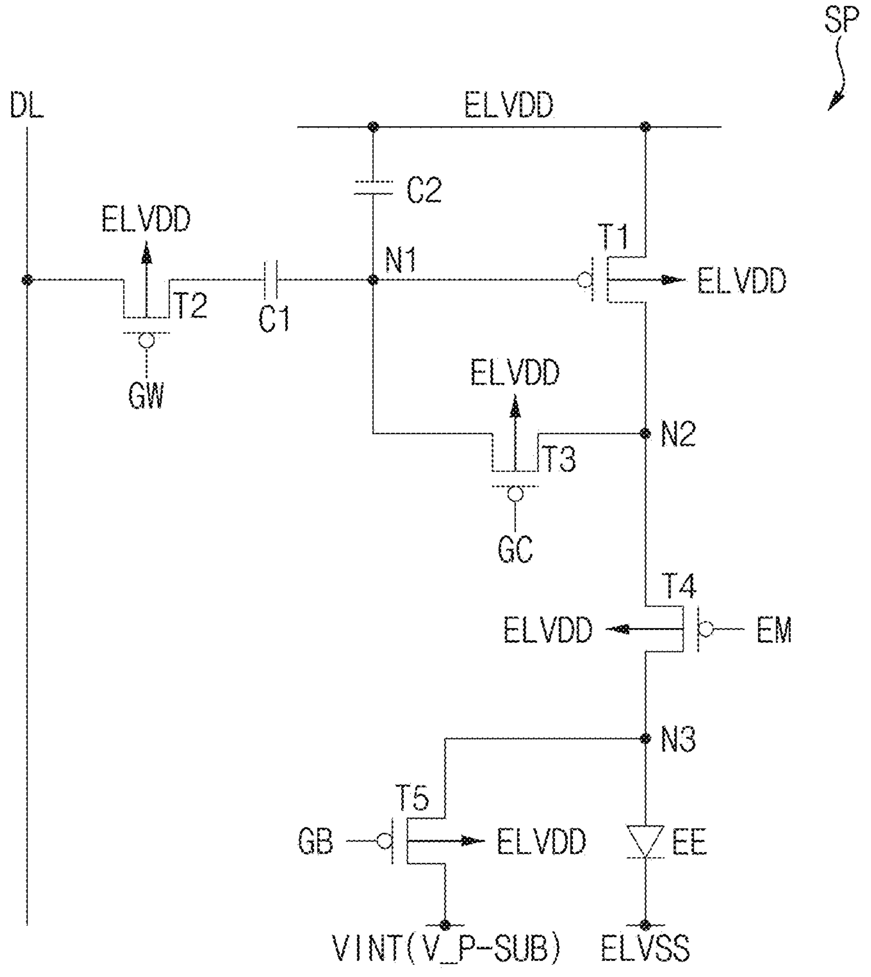
FIG. 5 is a circuit diagram showing an example of a sub-pixel in FIG. 1.

FIG. 5 is a circuit diagram showing an example of a sub-pixel SP in FIG. 1.

In FIG. 5, the same reference numerals and symbols denote the same or substantially the same (or similar) components as those described above. Because the sub-pixel SP according to the present embodiment may have a configuration that is the same or substantially the same as the configuration of the sub-pixel SP described above with reference to FIG. 2, except for the first electrode of the fifth transistor T5, redundant description may not be repeated, and the differences may be mainly described in more detail hereinafter.

Referring to FIGS. 1 and 5, an initialization voltage VINT may be applied to the first electrode of the fifth transistor T5.

According to an embodiment, a substrate voltage V_P-SUB applied to a substrate for forming the display panel 100 may be applied to the first electrode of the fifth transistor T5. According to an embodiment, the substrate may be a p-type substrate. For example, the substrate may be a silicon substrate.

For example, the substrate may be the p-type substrate, and each of the first to fifth transistors T1, T2, T3, T4, and T5 may be formed in an n-well, which is an n-type, formed on the p-type substrate.

The substrate voltage V_P-SUB may be a lowest voltage from among voltages applied to the display panel 100. In addition, the substrate voltage V_P-SUB may be any suitable generally used voltage that is applied to the first electrode of the fifth transistor T5, so that an additional power source for the initialization voltage VINT may not be required.

Figure 6:
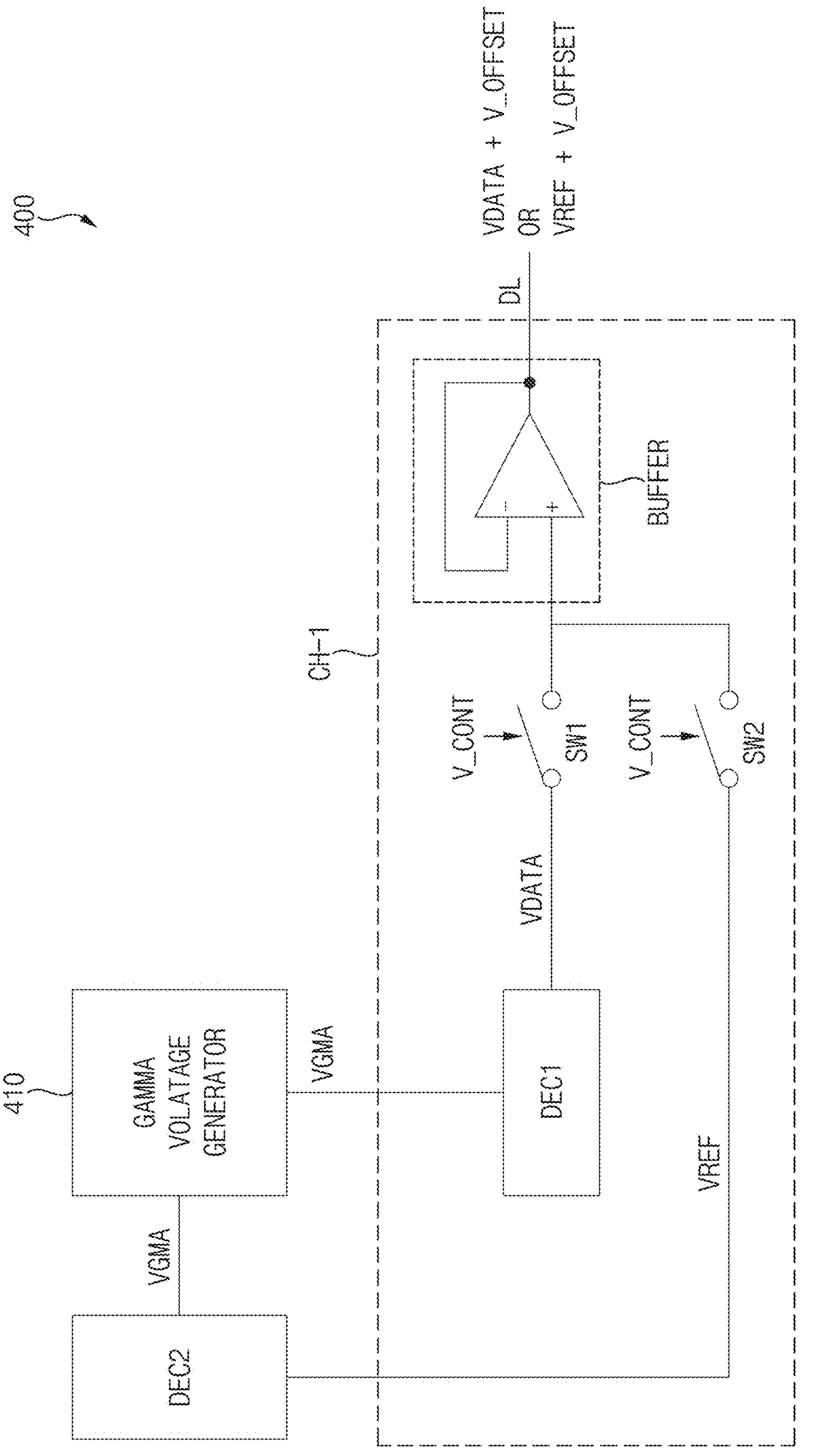
FIG. 6 is a view showing an example of a data driver in FIG. 1.
Figure 7:
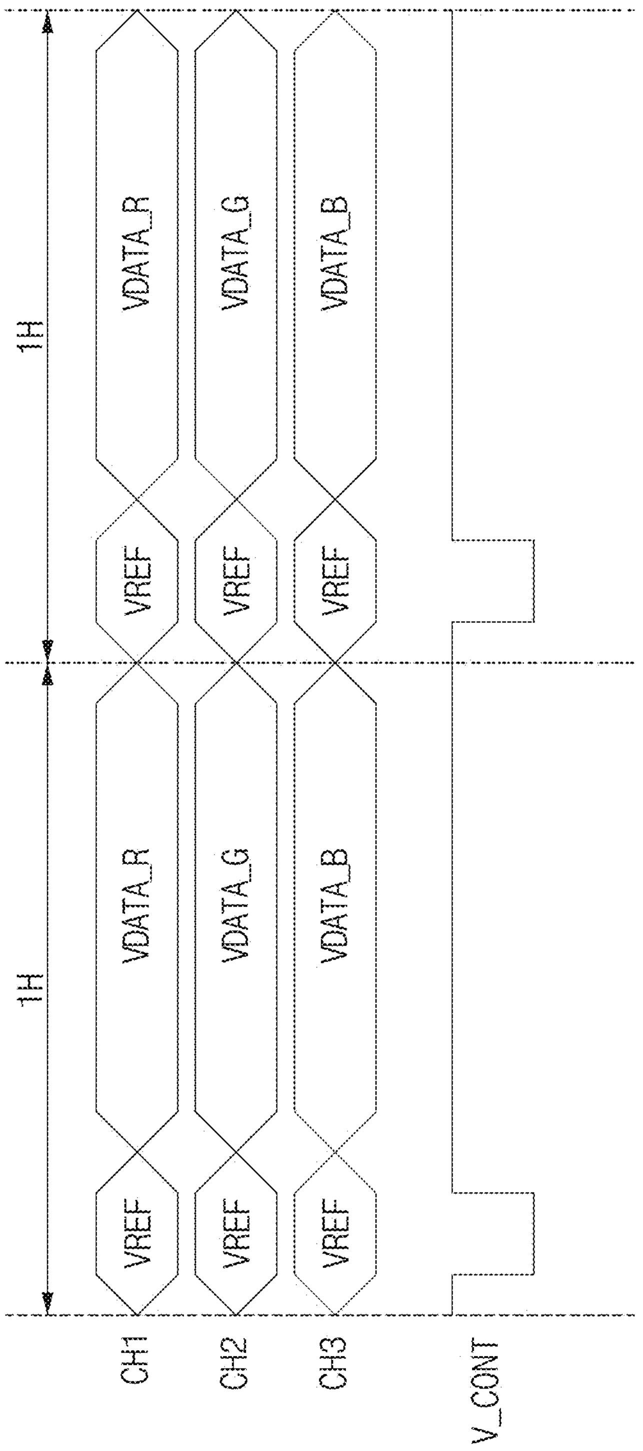
FIG. 7 is a timing diagram showing an example of signals used to drive a source channel in FIG. 6.
Figure 8:
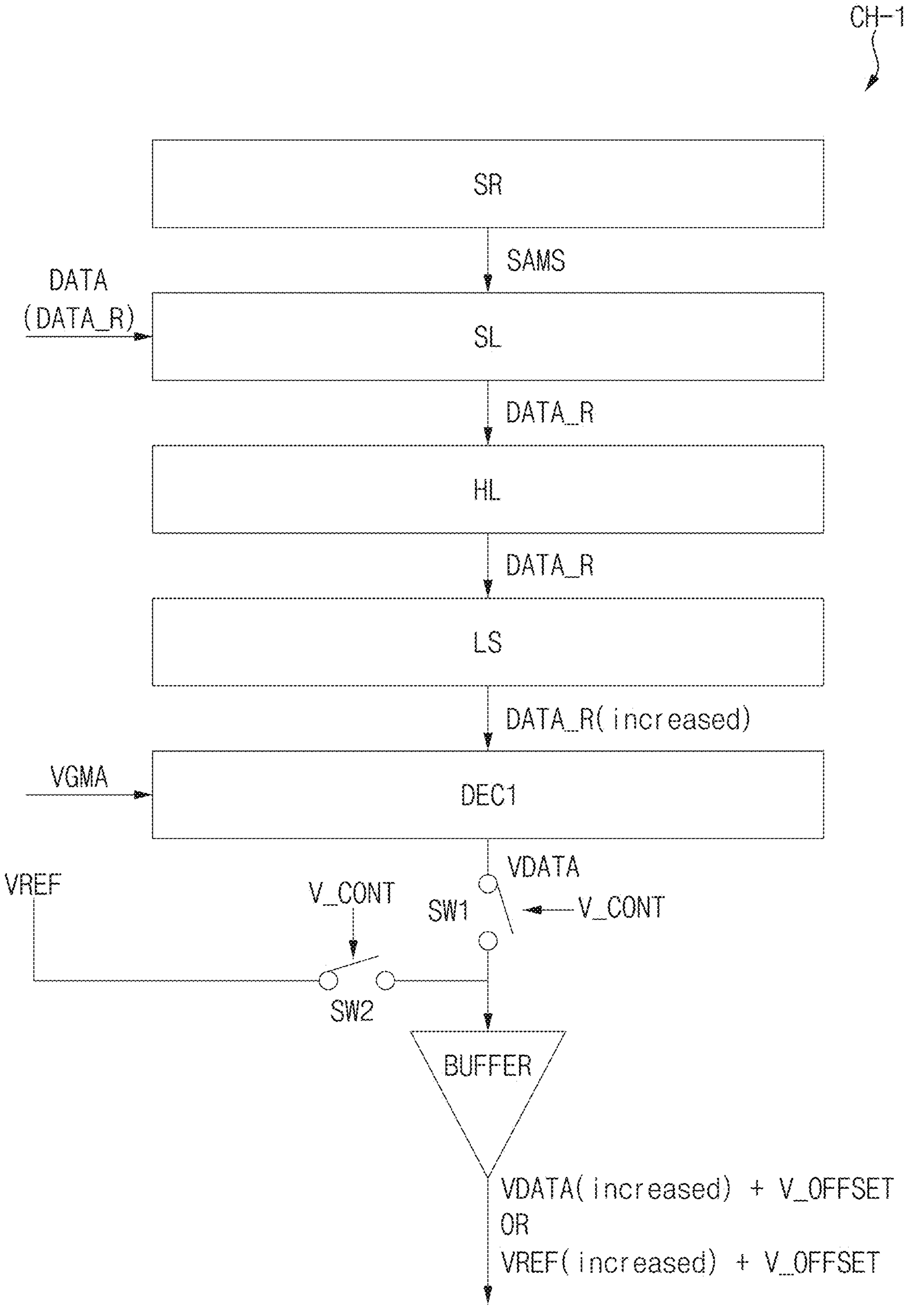
FIG. 8 is a view showing an example of a source channel of a data driver in FIG. 1.

FIG. 6 is a view showing an example of a data driver 400 in FIG. 1. FIG. 7 is a timing diagram showing an example of signals used to drive a source channel CH-1 in FIG. 6. FIG. 8 is a view showing an example of the source channel CH-1 of the data driver 400 in FIG. 1.

For convenience of illustration, in FIG. 6, components other than a first decoder DEC1 and an output buffer BUFFER of the source channel CH-1 may not be shown for ease of comprehension.

Referring to FIGS. 1, 2, 6, and 7, the data driver 400 may include the source channel CH-1, a gamma voltage generator 410, and a second decoder DEC2. The data driver 400 may include a plurality of source channels CH-1. The source channels CH-1 may respectively output the data voltage VDATA or the reference voltage VREF to the data lines DL.

The source channel CH-1 may include the output buffer BUFFER to selectively output the data voltage VDATA or the reference voltage VREF to a transistor (e.g., the second transistor T2) directly connected to a data line DL of the sub-pixel SP through the data line DL. For example, the source channel CH-1 may generate the data voltage VDATA based on gamma voltages VGMA, and may receive the reference voltage VREF from the second decoder DEC2.

For example, the source channel CH-1 may further include a first switch SW1 connected to the first decoder DEC1 and the output buffer BUFFER that may be turned on when a voltage control signal V_CONT has a high voltage level. Accordingly, the output buffer BUFFER may receive the data voltage VDATA.

According to an embodiment, the source channel CH-1 may include a first source channel CH1 connected to a first color sub-pixel configured to display a first color, a second source channel CH2 connected to a second color sub-pixel configured to display a second color, and a third source channel CH3 connected to a third color sub-pixel configured to display a third color.

For example, the first source channel CH1 may output a data voltage VDATA_R for the first color, the second source channel CH2 may output a data voltage VDATA_G for the second color, and the third source channel CH3 may output a data voltage VDATA_B for the third color.

For example, the first color may be a red color, the second color may be a green color, and the third color may be a blue color.

For example, the source channel CH-1 may further include a second switch SW2 connected to the second decoder DEC2 that may be turned on when the voltage control signal V_CONT has a low voltage level. Accordingly, the output buffer BUFFER may receive the reference voltage VREF.

For example, the voltage control signal V_CONT may have one low voltage level period during one horizontal time 1H, in which one pixel row (e.g., PR of FIG. 9) is driven.

The gamma voltage generator 410 may provide the gamma voltages VGMA to the first decoder DEC1 and the second decoder DEC2. For example, the gamma voltages VGMA may include a data voltage VDATA for each gray level.

Although the gamma voltage generator 410 has been described as being included in the data driver 400, the present disclosure is not limited thereto. For example, the gamma voltage generator 410 may be implemented as a separate component from the data driver 400.

The first decoder DEC1 may provide one of the gamma voltages VGMA to the output buffer BUFFER as the data voltage VDATA. For example, the first decoder DEC1 may select a gamma voltage VGMA corresponding to a gray level of the data signal (e.g., a pixel row data signal DATA_R) from among the gamma voltages VGMA as the data voltage VDATA.

The second decoder DEC2 may provide the reference voltage VREF to the output buffer BUFFER. According to an embodiment, the second decoder DEC2 may provide one of the gamma voltages VGMA as the reference voltage VREF. For example, the second decoder DEC2 may provide a lowest voltage from among the gamma voltages VGMA as the reference voltage VREF.

An output voltage of the output buffer BUFFER may include the offset voltage V_OFFSET of the output buffer BUFFER. When different components (e.g., different buffers) output the data voltage VDATA and the reference voltage VREF, respectively, an offset voltage V_OFFSET for the data voltage VDATA and an offset voltage V_OFFSET for the reference voltage VREF may be different from each other. In this case, a component for the offset voltage V_OFFSET may remain in the driving current, and offset voltages V_OFFSET of the output buffers BUFFER may be different from each other. In addition, as described above, the component of the offset voltage V_OFFSET remaining in the driving current may be gradually increased as a difference between the offset voltage V_OFFSET for the data voltage VDATA and the offset voltage V_OFFSET for the reference voltage VREF increases. In other words, when the reference voltage VREF is output to all of the sub-pixels SP from one component (e.g., one buffer), and the data voltages VDATA are output to the sub-pixels SP from a plurality of components (e.g., a plurality of buffers), the component of the offset voltage V_OFFSET may vary for each of the data lines DL, which may cause a luminance deviation. However, the data driver 400 according to one or more embodiments of the present disclosure may output the data voltage VDATA and the reference voltage VREF through one output buffer BUFFER, so that the luminance deviation may be minimized or reduced.

Referring to FIGS. 1, 6, and 8, the source channel CH-1 may include a shift register SR, a sampling latch SL, a holding latch HL, a level shifter LS, the first decoder DEC1, and the output buffer BUFFER.

The shift register SR may generate a sampling signal SAMS in response to a data clock signal. For example, the shift registers SR of the source channels CH-1 may sequentially generate sampling signals SAMS.

The sampling latch SL may store the data signal DATA in response to the sampling signal SAMS. For example, the sampling latch SL may store a corresponding portion of the pixel row data signal DATA_R applied from the timing controller 200 in response to the sampling signal SAMS. For example, sampling latches SL of the source channels CH-1 may sequentially store pixel row data signals DATA_R in response to the sampling signals SAMS.

The holding latch HL may receive the data signal (e.g., the pixel row data signal DATA_R) from the sampling latch SL to store the data signal. For example, the holding latch HL may receive the pixel row data signal DATA_R from the sampling latch SL to store the data signal in response to the load signal, and may apply the pixel row data signal DATA_R to the level shifter LS.

The level shifter LS may shift a voltage level of the applied pixel row data signal DATA_R. For example, the level shifter LS may increase the voltage level of the applied pixel row data signal DATA_R to apply the pixel row data signal DATA_R to the first decoder DEC1.

The first decoder DEC1 may generate the data voltage VDATA based on the data signal (e.g., the pixel row data signal DATA_R) having an increased voltage level. The first decoder DEC1 may generate the data voltages VDATA applied to the sub-pixels SP based on the gamma voltages VGMA.

The output buffer BUFFER may receive the data voltage VDATA or the reference voltage VREF to apply the received data voltage VDATA or the received reference voltage VREF to the sub-pixels SP. For example, the output buffer BUFFER may amplify the data voltage VDATA or the reference voltage VREF, and apply the amplified data voltage VDATA or the amplified reference voltage VREF to the sub-pixels SP.

Figure 9:
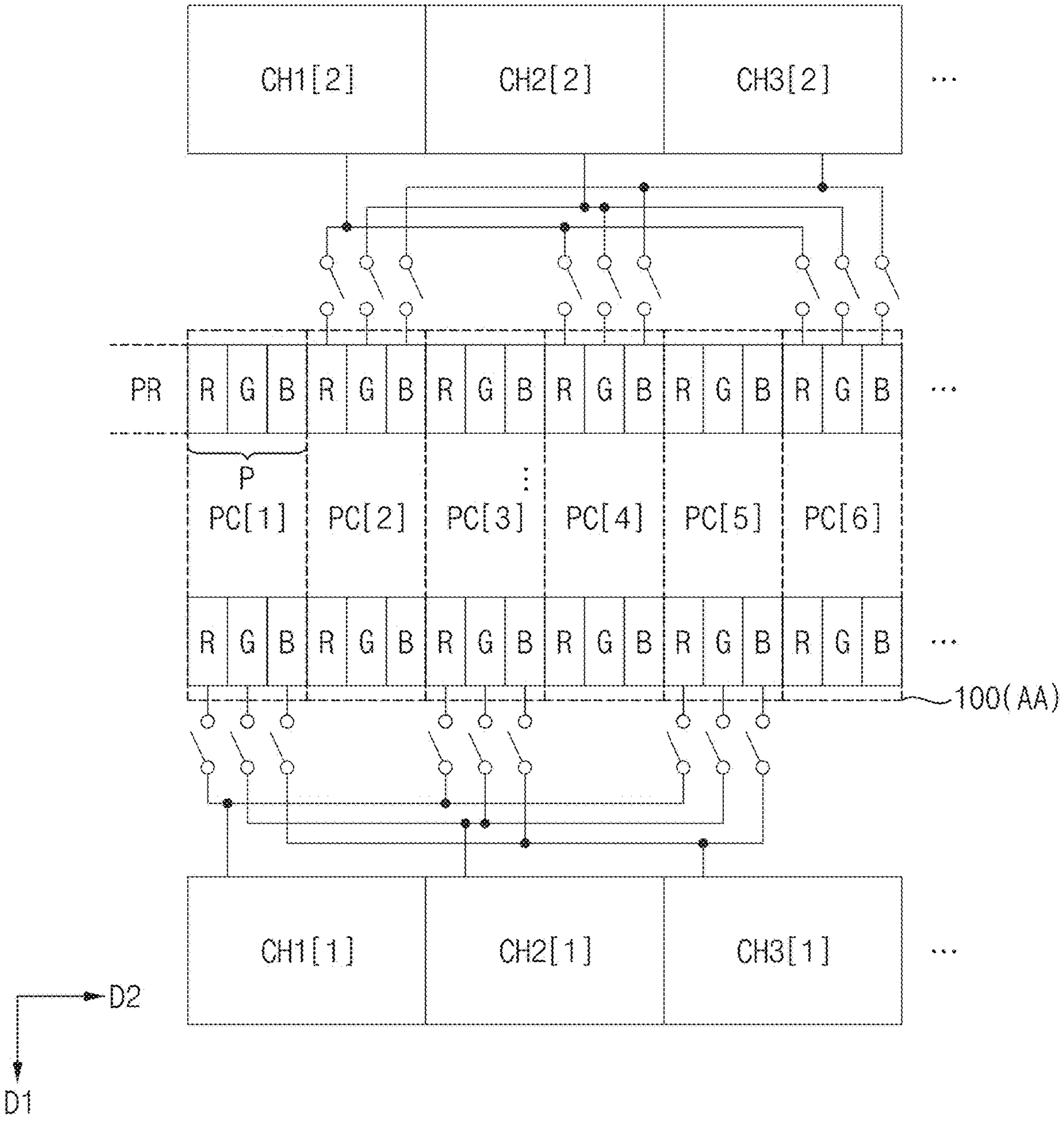
FIG. 9 is a view showing an example of a source channel connected to a display panel of the display device of FIG. 1.
Figure 10:
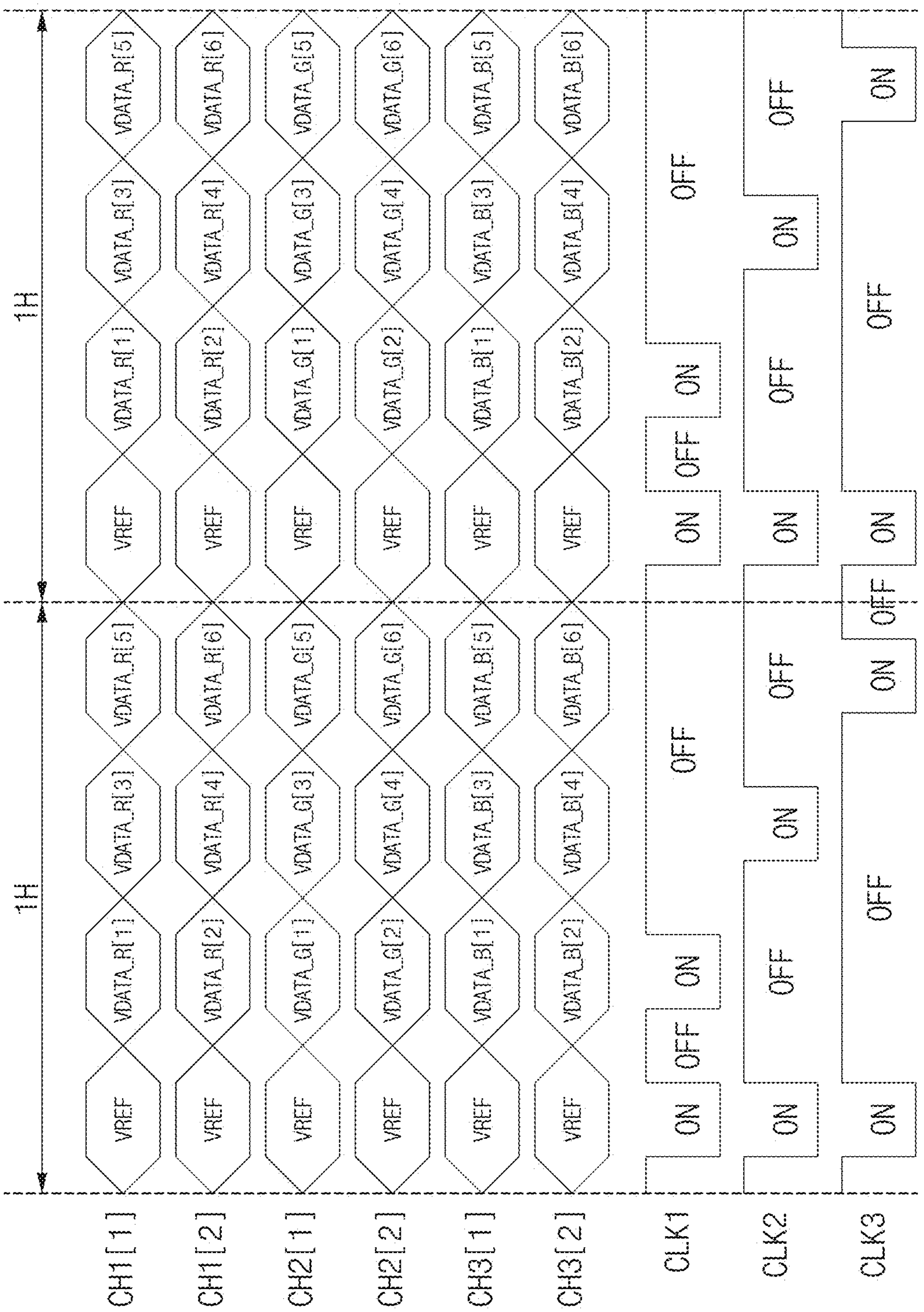
FIG. 10 is a timing diagram showing an example of signals used to drive source channels of the display device of FIG. 1.

FIG. 9 is a view showing an example of a source channel CH-1 connected to a display panel 100 of the display device of FIG. 1. FIG. 10 is a timing diagram showing an example of signals used to drive source channels CH-1 of the display device of FIG. 1.

Referring to FIGS. 8 to 10, the source channel CH-1 may be connected to a plurality of pixel columns PC[1], PC[2], . . . , and PC[6]. The source channel CH-1 may concurrently or substantially simultaneously output the reference voltage VREF to the pixel columns PC[1], PC[2], . . . , and PC[6], and may sequentially output the data voltages VDATA to the pixel columns PC[1], PC[2], . . . , and PC[6], respectively.

According to an embodiment, a pixel P may include a plurality of sub-pixels SP. For example, the pixel P may include a first color sub-pixel R to display a first color, a second color sub-pixel G to display a second color, and a third color sub-pixel B to display a third color.

Although in the present embodiment, the pixel P is illustrated as having an RGB stripe structure, the present disclosure is not limited to the structure of the pixel P shown in FIG. 9.

According to an embodiment, the source channel CH-1 may include first source channels CH1[1] and CH1[2] connected to first color sub-pixels R, second source channels CH2[1] and CH2[2] connected to second color sub-pixels G, and third source channels CH3[1] and CH3[2] connected to third color sub-pixels B.

According to an embodiment, a first part (e.g., CH1[1], CH2[1], and CH3[1]) of the source channels CH-1 may be adjacent to the display panel 100 in a first direction D1, and a second part (e.g., CH1[2], CH2[2], and CH3[2]) of the source channels CH-1, which are different from the first part, may be adjacent to the display panel 100 in a direction opposite to the first direction D1. In addition, the first parts (e.g., CH1[1], CH2[1], and CH3[1]) of the source channels CH-1 may be arranged along a second direction D2 crossing or intersecting the first direction D1, and the second parts (e.g., CH1[2], CH2[2], and CH3[2]) of the source channels CH-1 may be arranged along the second direction D2.

For example, a first channel CH1[1] of the first source channels may be connected to the first color sub-pixels R of first, third, and fifth pixel columns PC[1], PC[3], and PC[5]. For example, the first channel CH1[1] of the first source channels may apply the data voltage (e.g., VDATA_R[1]) or the reference voltage VREF to the first color sub-pixels R of the first pixel column PC[1] when a first clock signal CLK1 has a low voltage level. For example, the first channel CH1[1] of the first source channels may apply the data voltage (e.g., VDATA_R[3]) or the reference voltage VREF to the first color sub-pixels R of the third pixel column PC[3] when a second clock signal CLK2 has a low voltage level. For example, the first channel CH1[1] of the first source channels may apply the data voltage (e.g., VDATA_R[5]) or the reference voltage VREF to the first color sub-pixels R of the fifth pixel column PC[5] when a third clock signal CLK3 has a low voltage level.

For example, a second channel CH1[2] of the first source channels may be connected to the first color sub-pixels R of second, fourth, and sixth pixel columns PC[2], PC[4], and PC[6]. For example, the second channel CH1[2] of the first source channels may apply the data voltage (e.g., VDATA_R[2]) or the reference voltage VREF to the first color sub-pixels R of the second pixel column PC[2] when the first clock signal CLK1 has the low voltage level. For example, the second channel CH1[2] of the first source channels may apply the data voltage (e.g., VDATA_R[4]) or the reference voltage VREF to the first color sub-pixels R of the fourth pixel column PC[4] when the second clock signal CLK2 has the low voltage level. For example, the second channel CH1[2] of the first source channels may apply the data voltage (e.g., VDATA_R[6]) or the reference voltage VREF to the first color sub-pixels R of the sixth pixel column PC[6] when the third clock signal CLK3 has the low voltage level.

For example, a first channel CH2[1] of the second source channels may be connected to the second color sub-pixels G of the first, third, and fifth pixel columns PC[1], PC[3], and PC[5]. For example, the first channel CH2[1] of the second source channels may apply the data voltage (e.g., VDATA_G[1]) or the reference voltage VREF to the second color sub-pixels G of the first pixel column PC[1] when the first clock signal CLK1 has the low voltage level. For example, the first channel CH2[1] of the second source channels may apply the data voltage (e.g., VDATA_G[3]) or the reference voltage VREF to the second color sub-pixels G of the third pixel column PC[3] when the second clock signal CLK2 has the low voltage level. For example, the first channel CH2[1] of the second source channels may apply the data voltage (e.g., VDATA_G[5]) or the reference voltage VREF to the second color sub-pixels G of the fifth pixel column PC[5] when the third clock signal CLK3 has the low voltage level.

For example, a second channel CH2[2] of the second source channels may be connected to the second color sub-pixels G of the second, fourth, and sixth pixel columns PC[2], PC[4], and PC[6]. For example, the second channel CH2[2] of the second source channels may apply the data voltage (e.g., VDATA_G[2]) or the reference voltage VREF to the second color sub-pixels G of the second pixel column PC[2] when the first clock signal CLK1 has the low voltage level. For example, the second channel CH2[2] of the second source channels may apply the data voltage (e.g., VDATA_G[4]) or the reference voltage VREF to the second color sub-pixels G of the fourth pixel column PC[4] when the second clock signal CLK2 has the low voltage level. For example, the second channel CH2[2] of the second source channels may apply the data voltage (e.g., VDATA_G[6]) or the reference voltage VREF to the second color sub-pixels G of the sixth pixel column PC[6] when the third clock signal CLK3 has the low voltage level.

For example, a first channel CH3[1] of the third source channels may be connected to the third color sub-pixels B of the first, third, and fifth pixel columns PC[1], PC[3], and PC[5]. For example, the first channel CH3[1] of the third source channels may apply the data voltage (e.g., VDATA_B[1]) or the reference voltage VREF to the third color sub-pixels B of the first pixel column PC[1] when the first clock signal CLK1 has the low voltage level. For example, the first channel CH3[1] of the third source channels may apply the data voltage (e.g., VDATA_B[3]) or the reference voltage VREF to the third color sub-pixels B of the third pixel column PC[3] when the second clock signal CLK2 has the low voltage level. For example, the first channel CH3[1] of the third source channels may apply the data voltage (e.g., VDATA_B[5]) or the reference voltage VREF to the third color sub-pixels B of the fifth pixel column PC[5] when the third clock signal CLK3 has the low voltage level.

For example, a second channel CH3[2] of the third source channels may be connected to the third color sub-pixels B of the second, fourth, and sixth pixel columns PC[2], PC[4], and PC[6]. For example, the second channel CH3[2] of the third source channels may apply the data voltage (e.g., VDATA_B[2]) or the reference voltage VREF to the third color sub-pixels B of the second pixel column PC[2] when the first clock signal CLK1 has the low voltage level. For example, the second channel CH3[2] of the third source channels may apply the data voltage (e.g., VDATA_B[4]) or the reference voltage VREF to the third color sub-pixels B of the fourth pixel column PC[4] when the second clock signal CLK2 has the low voltage level. For example, the second channel CH3[2] of the third source channels may apply the data voltage (e.g., VDATA_B[6]) or the reference voltage VREF to the third color sub-pixels B of the sixth pixel column PC[6] when the third clock signal CLK3 has the low voltage level.

When the source channels CH-1 output the reference voltage VREF, all the first to third clock signals CLK1, CLK2, and CLK3 may have the low voltage levels. When the source channels CH-1 output the data voltages VDATA, the first to third clock signals CLK1, CLK2, and CLK3 may sequentially have the low voltage levels. In other words, each of the source channels CH-1 may sequentially output the data voltages VDATA to the corresponding pixel columns PC[1], PC[2], . . . , and PC[6] connected to the source channels CH-1.

Although one source channel CH-1 is illustrated in the present embodiment as being connected to the pixel columns PC[1], PC[2], . . . , and PC[6], the present disclosure is not limited to the number of pixel columns to which one source channel CH-1 is connected. For example, one source channel CH-1 may be connected to one pixel column. In addition, the present disclosure is not limited to the number of the pixel columns PC[1], PC[2], . . . , and PC[6] and the number of pixel rows PR shown in the figures.

The structure described above with reference to FIG. 9 may also be applied to source channels CH-2 and CH-3 described in more detail below.

Figure 11:
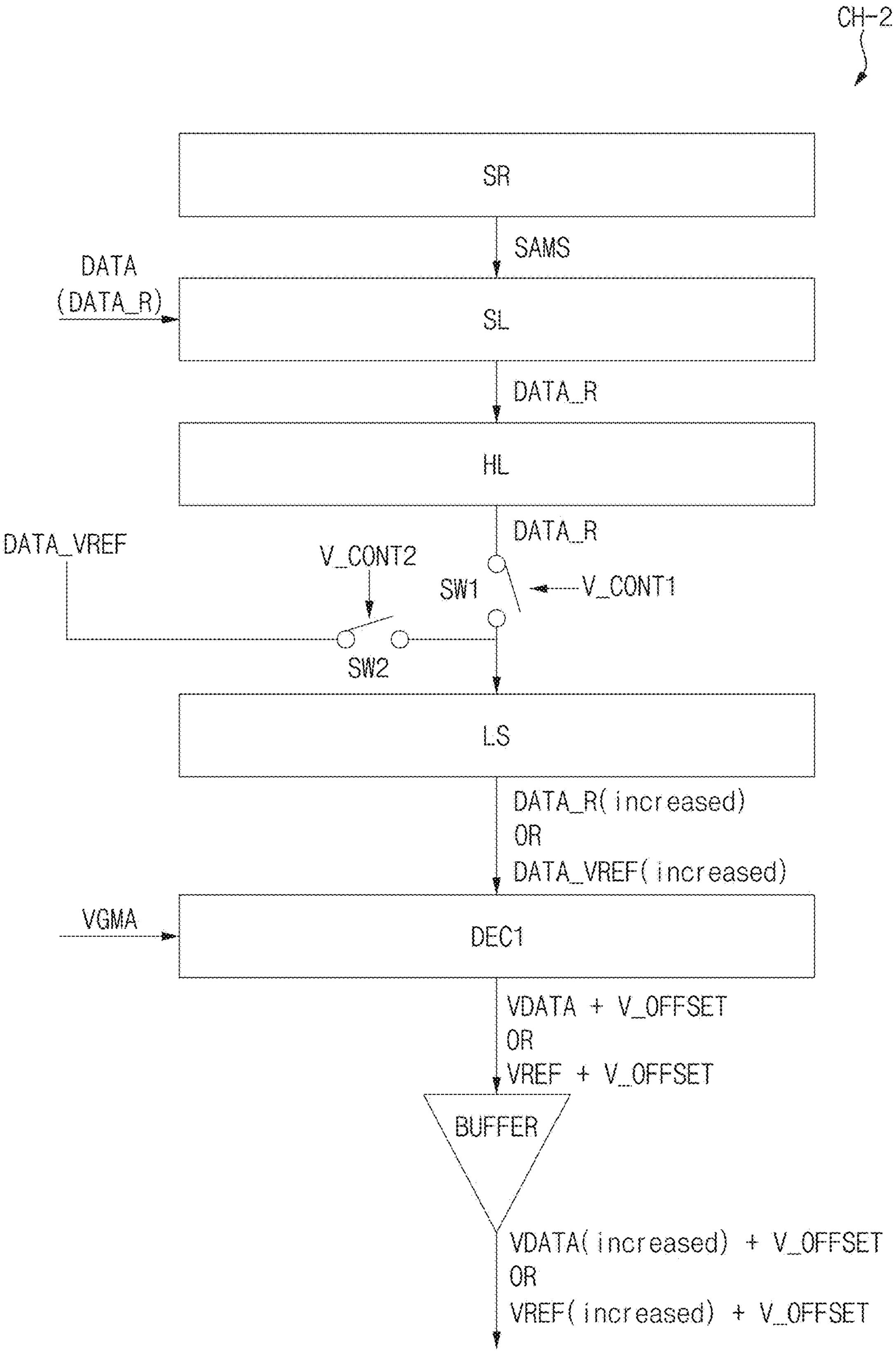
FIG. 11 is a view showing a source channel of a display device according to one or more embodiments of the present disclosure.
Figure 12:
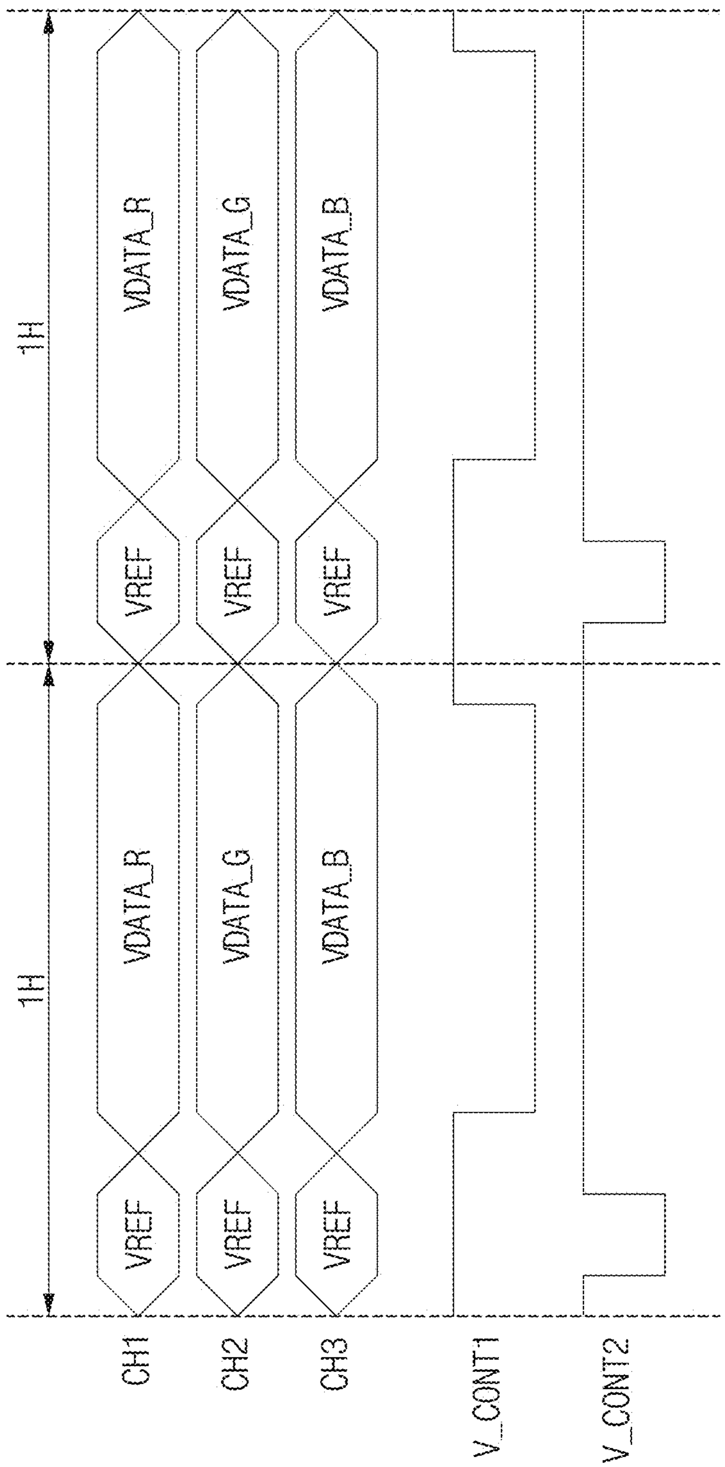
FIG. 12 is a timing diagram showing an example of signals used to drive the source channel of FIG. 11.

FIG. 11 is a view showing a source channel CH-2 of a display device according to one or more embodiments of the present disclosure. FIG. 12 is a timing diagram showing an example of signals used to drive the source channel CH-2 of FIG. 11.

In FIG. 11, the same reference numerals and symbols are used to denote the same or substantially the same (or similar) components as those described above. Because the display device according to the present embodiment may have a configuration that is the same or substantially the same as the configuration of the display device described above with reference to FIG. 1, except for the source channel CH-2, redundant description may not be repeated, and the differences may be mainly described in more detail hereinafter.

Referring to FIGS. 1, 2, 11, and 12, the source channel CH-2 may include an output buffer BUFFER to selectively output the data voltage VDATA or the reference voltage VREF.

The source channel CH-2 may include a shift register SR, a sampling latch SL, a holding latch HL, a level shifter LS, a first decoder DEC1, and the output buffer BUFFER.

The shift register SR may generate a sampling signal SAMS in response to a data clock signal. For example, shift registers SR of the source channels CH-2 may sequentially generate sampling signals SAMS.

The sampling latch SL may store the data signal DATA in response to the sampling signal SAMS. For example, the sampling latch SL may store a corresponding portion of the pixel row data signal DATA_R applied from the timing controller 200 in response to the sampling signal SAMS. For example, sampling latches SL of the source channels CH-2 may sequentially store pixel row data signals DATA_R in response to the sampling signals SAMS.

The holding latch HL may receive the data signal (e.g., the pixel row data signal DATA_R) from the sampling latch SL to store the data signal. For example, the holding latch HL may receive the pixel row data signal DATA_R from the sampling latch SL to store the data signal in response to the load signal, and may apply the pixel row data signal DATA_R to the level shifter LS.

The level shifter LS may selectively receive the data signal (e.g., the pixel row data signal DATA_R) or reference voltage data DATA_VREF. The reference voltage data DATA_VREF may include information on a voltage level of the reference voltage VREF.

For example, a first switch SW1 may be turned on when a first voltage control signal V_CONT1 has a low voltage level. Accordingly, the level shifter LS may receive the data signal (e.g., the pixel row data signal DATA_R).

For example, a second switch SW2 may be turned on when a second voltage control signal V_CONT2 has a low voltage level. Accordingly, the level shifter LS may receive the reference voltage data DATA_VREF.

The level shifter LS may shift voltage levels of the data signal (e.g., the pixel row data signal DATA_R) and the reference voltage data DATA_VREF. For example, the level shifter LS may increase the voltage levels of the applied pixel row data signal DATA_R and the applied reference voltage data DATA_VREF to apply the pixel row data signal DATA_R and the reference voltage data DATA_VREF to the first decoder DEC1.

The first decoder DEC1 may generate the data voltage VDATA based on the data signal (e.g., the pixel row data signal DATA_R) having an increased voltage level. The first decoder DEC1 may generate the data voltages VDATA applied to the sub-pixels SP based on the gamma voltages VGMA.

The first decoder DEC1 may generate the reference voltage VREF based on the reference voltage data DATA_VREF having an increased voltage level.

The output buffer BUFFER may receive the data voltage VDATA or the reference voltage VREF to apply the received data voltage VDATA or the received reference voltage VREF to the sub-pixels SP. For example, the output buffer BUFFER may amplify the data voltage VDATA or the reference voltage VREF, and apply the amplified data voltage VDATA or the amplified reference voltage VREF to the sub-pixels SP.

Figure 13:
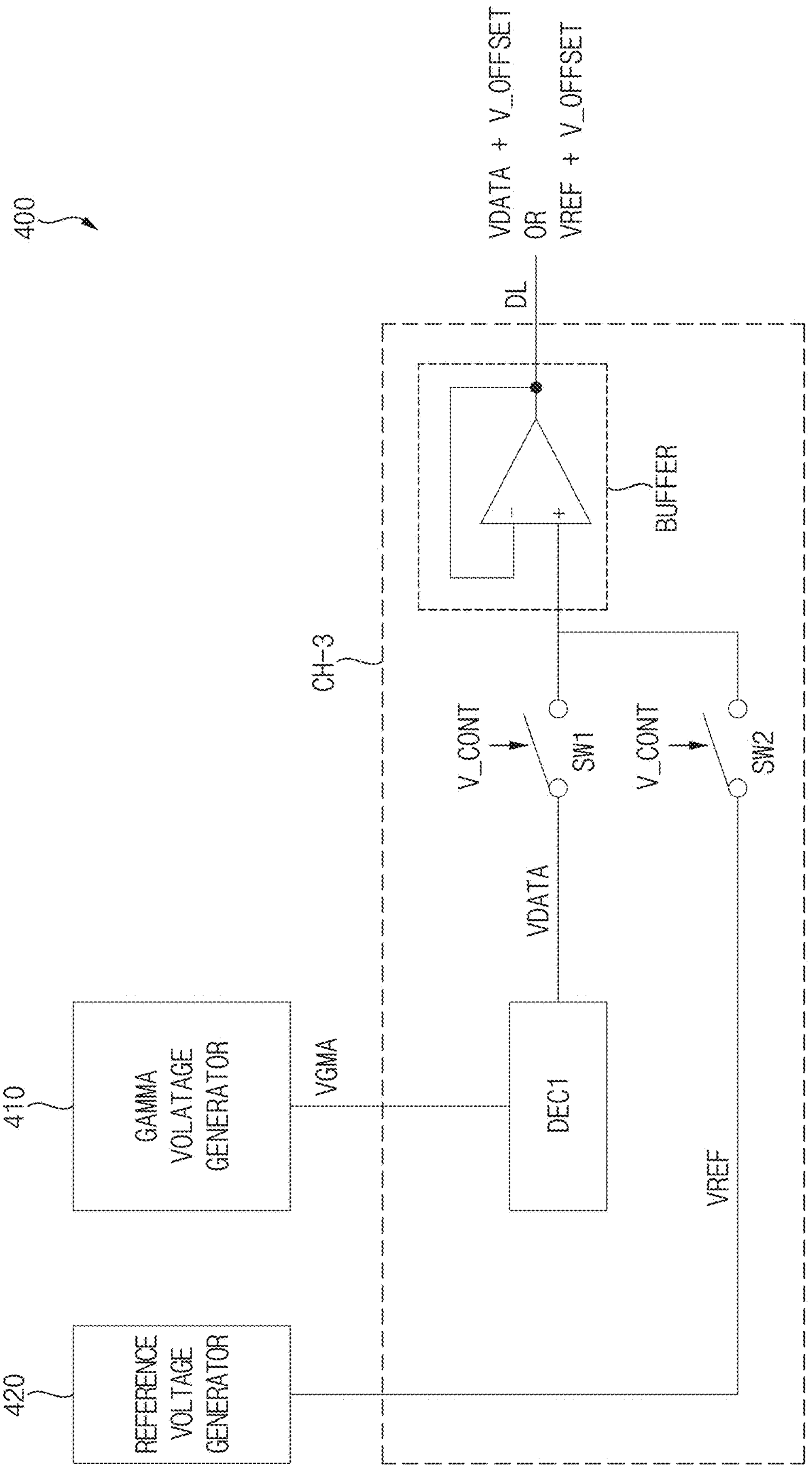
FIG. 13 is a view showing an example of a data driver of a display device according to one or more embodiments of the present disclosure.

FIG. 13 is a view showing an example of a data driver 400 of a display device according to one or more embodiments of the present disclosure.

In FIG. 13, the same reference numerals and symbols are used to denote the same or substantially the same (or similar) components as those described above. Because a source channel CH-3 according to the present embodiment may have a configuration that is the same or substantially the same as the configuration of the source channel CH-1 described above with reference to FIG. 6, except for a reference voltage generator 420, redundant description may not be repeated, and the differences may be mainly described in more detail hereinafter.

The data driver 400 may include the source channel CH-3, a gamma voltage generator 410, and the reference voltage generator 420.

The source channel CH-3 may include an output buffer BUFFER to selectively output the data voltage VDATA or the reference voltage VREF. For example, the source channel CH-3 may generate the data voltage VDATA based on gamma voltages VGMA, and may receive the reference voltage VREF from the reference voltage generator 420.

For example, the source channel CH-3 may include a first switch SW1 connected to the first decoder DEC1 and the output buffer BUFFER that may be turned on when a voltage control signal V_CONT has a high voltage level. Accordingly, the output buffer BUFFER may receive the data voltage VDATA.

For example, the source channel CH-3 may include a second switch SW2 connected to the reference voltage generator 420 that may be turned on when the voltage control signal V_CONT has a low voltage level. Accordingly, the output buffer BUFFER may receive the reference voltage VREF.

The gamma voltage generator 410 may provide the gamma voltages VGMA to the first decoder DEC1. For example, the gamma voltages VGMA may include a data voltage VDATA for each gray level.

Although the gamma voltage generator 410 is illustrated in the present embodiment as being included in the data driver 400, the present disclosure is not limited thereto. For example, the gamma voltage generator 410 may be implemented as a separate component from the data driver 400.

Although the reference voltage generator 420 is illustrated in the present embodiment as being included in the data driver 400, the present disclosure is not limited thereto. For example, the reference voltage generator 420 may be implemented as a separate component from the data driver 400.

Figure 14:
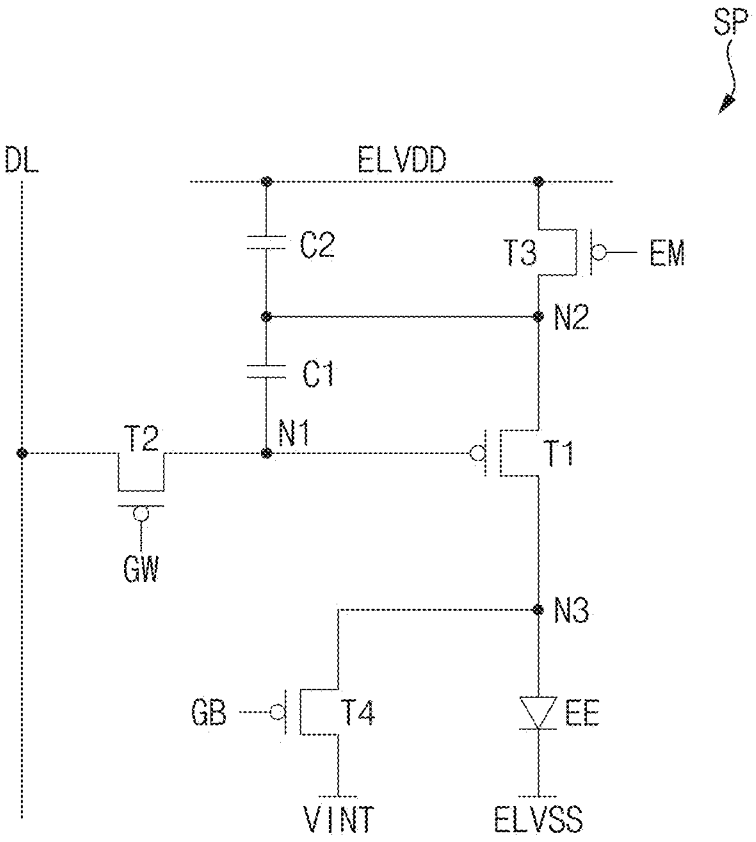
FIG. 14 is a circuit diagram showing a sub-pixel according to one or more embodiments of the present disclosure.

FIG. 14 is a circuit diagram showing a sub-pixel SP according to one or more embodiments of the present disclosure.

In FIG. 14, the same reference numerals and symbols are used to denote the same or substantially the same (or similar) components as those described above. Because a display device according to the present embodiments may have a configuration that is the same or substantially the same as the configuration of the display device described above with reference to FIG. 1, except for the sub-pixel SP, redundant description may not be repeated, and the differences may be mainly described in more detail hereinafter.

Referring to FIGS. 1, 6, and 14, a sub-pixel SP may include a first capacitor C1, a first transistor T1, a second transistor T2, and a light emitting element EE. The first transistor T1 may include a control electrode connected to the first capacitor C1, and may generate a driving current. The second transistor T2 may provide a data voltage VDATA or a reference voltage VREF to the first capacitor C1 in response to a write gate signal GW, and may be connected to the first capacitor C1. The light emitting element EE may receive the driving current to emit light.

The first transistor T1 may include the control electrode connected to a first node N1, a first electrode connected to a second node N2, and a second electrode connected to a third node N3. The second transistor T2 may include a control electrode to receive the write gate signal GW, a first electrode to receive the data voltage VDATA or the reference voltage VREF, and a second electrode connected to the first node N1. The sub-pixel SP may further include a third transistor T3, a fourth transistor T4, and a second capacitor C2. The third transistor T3 may include a control electrode to receive an emission signal EM, a first electrode to receive a first power voltage ELVDD, and a second electrode connected to the second node N2. The fourth transistor T4 may include a control electrode to receive a bias gate signal GB, a first electrode to receive an initialization voltage VINT, and a second electrode connected to the third node N3. The second capacitor C2 may include a first electrode to receive the first power voltage ELVDD, and a second electrode connected to the second node N2. The light emitting element EE may include a first electrode connected to the third node N3, and a second electrode to receive a second power voltage ELVSS.

The first to fourth transistors T1, T2, T3, and T4 may be implemented as PMOS transistors. However, the present disclosure is not limited thereto. For example, the first to fourth transistors T1, T2, T3, and T4 may be implemented as NMOS transistors.

Figure 15:
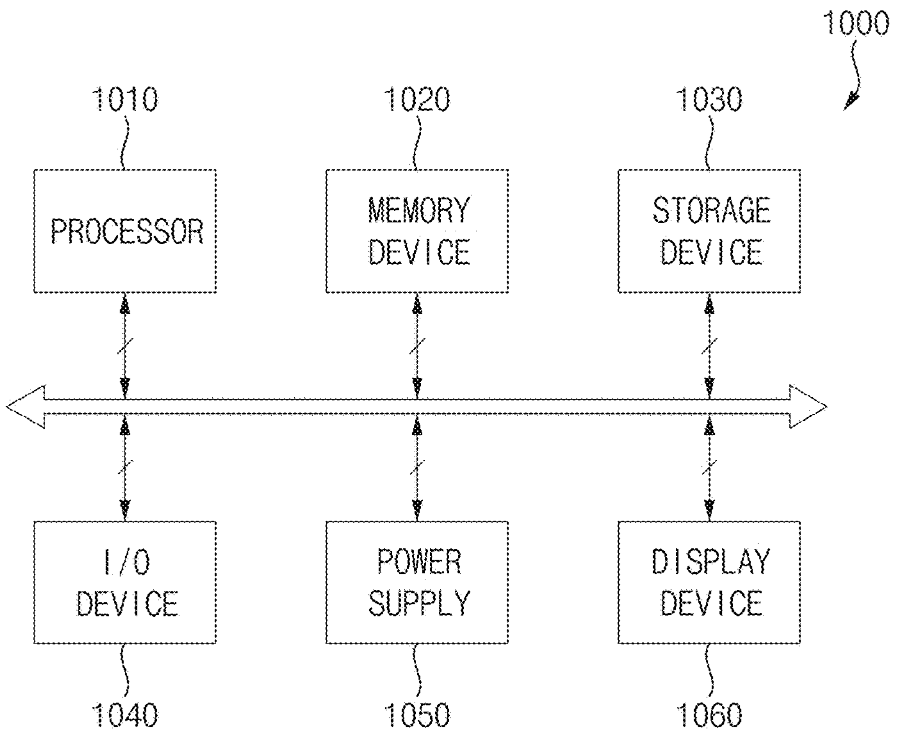
FIG. 15 is a block diagram showing an electronic device according to one or more embodiments of the present disclosure.
Figure 16:
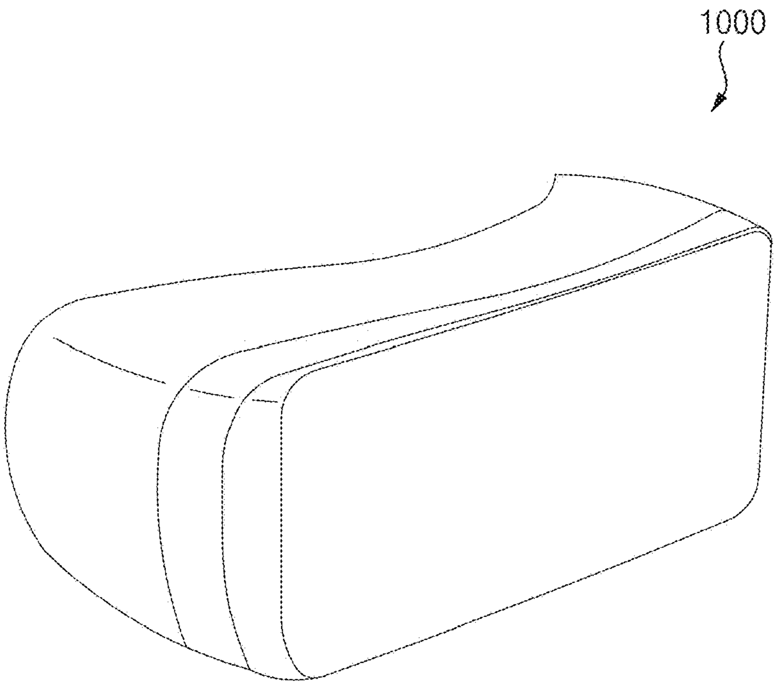
FIG. 16 is a diagram showing an example in which the electronic device of FIG. 15 is implemented as a virtual reality (VR) device.

FIG. 15 is a block diagram showing an electronic device according to one or more embodiments of the present disclosure. FIG. 16 is a diagram showing an example in which the electronic device of FIG. 15 is implemented as a virtual reality (VR) device.

Referring to FIGS. 15 and 16, the electronic device 1000 may include a processor 1010, a memory device 1020, a storage device 1030, an input/output (I/O) device 1040, a power supply 1050, and a display device 1060. For example, the display device 1060 may be the display device described above with reference to FIG. 1. In addition, the electronic device 1000 may further include a plurality of ports for communicating with a video card, a sound card, a memory card, a universal serial bus (USB) device, other electronic devices, and/or the like. In an embodiment, as shown in FIG. 16, the electronic device 1000 may be implemented as a VR device. However, the present disclosure is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and/or the like. The processor 1010 may be coupled to other components via an address bus, a control bus, a data bus, and/or the like. Further, the processor 1010 may be coupled to an extended bus, such as a peripheral component interconnection (PCI) bus.

The memory device 1020 may store data for operations of the electronic device 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like, and/or at least one volatile memory device, such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and/or the like.

The I/O device 1040 may include an input device, such as a keyboard, a keypad, a mouse device, a touch-pad, a touch-screen, and/or the like, and an output device, such as a printer, a speaker, and/or the like. In some embodiments, the I/O device 1040 may include the display device 1060.

The power supply 1050 may provide power used for the operations of the electronic device 1000. For example, the power supply 1050 may be a power management integrated circuit (PMIC).

The display device 1060 may display an image corresponding to visual information of the electronic device 1000. In some embodiments, the display device 1060 may be an organic light emitting display device or a quantum dot light emitting display device, but the present disclosure is not limited thereto. The display device 1060 may be connected to other components through the buses or other communication links. The display device 1060 may include a data driver to output a data voltage and a reference voltage with the same or substantially the same (e.g., an identical) offset voltage as each other, so that a luminance difference between data lines may be minimized or reduced.

Embodiments of the present disclosure may be applied to a display device, and an electronic device including the display device. For example, embodiments of the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, and the like.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:

a display panel comprising a sub-pixel; and a data driver configured to provide a data voltage to the sub-pixel to emit light corresponding to the data voltage, wherein the data driver comprises an output buffer configured to:

output the data voltage and an offset voltage to a data line connected to the sub-pixel when the data voltage is to be applied to the sub-pixel; and output a reference voltage and the offset voltage to the data line when the reference voltage is to be applied to the sub-pixel.

2. The display device of claim 1, wherein the data driver further comprises:

a first decoder configured to provide one of gamma voltages to the output buffer as the data voltage.

3. The display device of claim 2, wherein the data driver further comprises:

a second decoder configured to provide one of the gamma voltages to the output buffer as the reference voltage.

4. The display device of claim 2, wherein the data driver further comprises:

a reference voltage generator configured to provide the reference voltage to the output buffer.

5. The display device of claim 2, wherein the data driver further comprises:

a shift register configured to generate a sampling signal;

a sampling latch configured to store a data signal in response to the sampling signal;

a holding latch configured to receive the data signal from the sampling latch to store the data signal; and a level shifter configured to shift voltage levels of the data signal and reference voltage data, and wherein the data voltage is generated based on the data signal, and the reference voltage is generated based on the reference voltage data.

6. The display device of claim 1, wherein the sub-pixel comprises:

a first capacitor comprising a first electrode and a second electrode connected to a first node;

a first transistor configured to generate a driving current, and comprising a control electrode connected to the first node, a first electrode configured to receive a first power voltage, and a second electrode connected to a second node;

a second transistor configured to provide a voltage applied from the data line to the first capacitor in response to a write gate signal, and comprising a control electrode configured to receive the write gate signal, a first electrode connected to the data line, and a second electrode connected to the first electrode of the first capacitor; and a light emitting element configured to receive the driving current to emit light, and comprising a first electrode connected to a third node, and a second electrode configured to receive a second power voltage.

7. The display device of claim 6, wherein the sub-pixel further comprises:

a third transistor comprising a control electrode configured to receive a compensation gate signal, a first electrode connected to the second node, and a second electrode connected to the first node;

a fourth transistor comprising a control electrode configured to receive an emission signal, a first electrode connected to the second node, and a second electrode connected to the third node;

a fifth transistor comprising a control electrode configured to receive a bias gate signal, a first electrode, and a second electrode connected to the third node; and a second capacitor comprising a first electrode connected to the first node, and a second electrode configured to receive the first power voltage.

8. The display device of claim 7, wherein each of the emission signal, the compensation gate signal, the bias gate signal, and the write gate signal has an activation period in an initialization period, wherein each of the compensation gate signal, the bias gate signal, and the write gate signal has an activation period in a threshold voltage compensation period, and wherein the write gate signal has an activation period in a data writing period.

9. The display device of claim 8, wherein the output buffer is configured to output the reference voltage and the offset voltage to the data line in the initialization period and the threshold voltage compensation period, and wherein the output buffer is configured to output the data voltage and the offset voltage to the data line in the data writing period.

10. The display device of claim 7, wherein the first electrode of the fifth transistor is grounded.

11. The display device of claim 7, wherein the first electrode of the fifth transistor is configured to receive an initialization voltage.

12. The display device of claim 11, wherein the initialization voltage is a substrate voltage applied to a p-type substrate.

13. The display device of claim 7, wherein each of the first to fifth transistors further comprises a back gate electrode configured to receive the first power voltage.

14. The display device of claim 1, wherein the sub-pixel comprises:

a first capacitor comprising a first electrode connected to a second node, and a second electrode connected to a first node;

a second capacitor comprising a first electrode configured to receive a first power voltage, and a second electrode connected to the second node;

a first transistor configured to generate a driving current, and comprising a control electrode connected to the first node, a first electrode connected to the second node, and a second electrode connected to a third node;

a second transistor configured to provide a voltage applied from the data line to the first node in response to a write gate signal, and comprising a control electrode configured to receive the write gate signal, a first electrode connected to the data line, and a second electrode connected to the first node; and a light emitting element configured to receive the driving current to emit light, and comprising a first electrode connected to the third node and a second electrode configured to receive a second power voltage.

15. The display device of claim 14, wherein the sub-pixel further comprises:

a third transistor comprising a control electrode configured to receive an emission signal, a first electrode configured to receive the first power voltage, and a second electrode connected to the second node; and a fourth transistor comprising a control electrode configured to receive a bias gate signal, a first electrode configured to receive an initialization voltage, and a second electrode connected to the third node.

16. The display device of claim 15, wherein each of the first to fourth transistors further comprises a back gate electrode configured to receive the first power voltage.

17. An electronic device comprising:

a display device; and a processor configured to provide image data to the display device, wherein the display device comprises:

a display panel comprising a sub-pixel; and a data driver configured to provide a data voltage to the sub-pixel to emit light corresponding to the data voltage, and wherein the data driver comprises an output buffer configured to:

output the data voltage and an offset voltage to a data line connected to the sub-pixel when the data voltage is to be applied to the sub-pixel; and output a reference voltage and the offset voltage to the data line when the reference voltage is to be applied to the sub-pixel.

18. The electronic device of claim 17, wherein the data driver further comprises:

a first decoder configured to provide one of gamma voltages to the output buffer as the data voltage.

19. The electronic device of claim 18, wherein the data driver further comprises:

a second decoder configured to provide one of the gamma voltages to the output buffer as the reference voltage.

20. The electronic device of claim 18, wherein the data driver further comprises:

a reference voltage generator configured to provide the reference voltage to the output buffer.

* * * * *